(12) United States Patent
Les et al.

(10) Patent No.: US 12,128,728 B1
(45) Date of Patent: Oct. 29, 2024

(54) SUSPENSION SYSTEM WITH DUAL RATE TORSION BAR

(71) Applicant: GM GLOBAL TECHNOLOGY OPERATIONS LLC, Detroit, MI (US)

(72) Inventors: Anderson Les, Rochester Hills, MI (US); Jeffery L. Vogt, Fenton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/306,815

(22) Filed: Apr. 25, 2023

(51) Int. Cl.
*B60G 17/02* (2006.01)
*B60G 3/06* (2006.01)
*B60G 11/18* (2006.01)

(52) U.S. Cl.
CPC .............. *B60G 17/025* (2013.01); *B60G 3/06* (2013.01); *B60G 11/183* (2013.01); *B60G 2200/142* (2013.01); *B60G 2202/134* (2013.01); *B60G 2204/122* (2013.01); *B60G 2204/143* (2013.01); *B60G 2204/41* (2013.01); *B60G 2206/15* (2013.01); *B60G 2206/42* (2013.01)

(58) Field of Classification Search
CPC ............ B60G 17/025; B60G 2204/122; B60G 2204/143; B60G 2204/41; B60G 11/18; B60G 11/183; B60G 11/189; B60G 11/20; B60G 2202/13; B60G 2202/134; B60G 3/06; B60G 2200/142; B60G 2206/15; B60G 2206/42
See application file for complete search history.

(56) References Cited

U.S. PATENT DOCUMENTS

| | | | | |
|---|---|---|---|---|
| 2,606,759 A | * | 8/1952 | Colby ................. | B60G 11/183 267/284 |
| 2,983,505 A | * | 5/1961 | Hanslip ............... | B60G 11/187 280/124.167 |
| 2,998,241 A | * | 8/1961 | Eyb ...................... | B60G 11/181 267/284 |
| 3,333,865 A | * | 8/1967 | Boehner ............. | B60G 11/182 280/124.13 |
| 3,337,236 A | * | 8/1967 | Peterson ............ | B60G 21/0553 280/124.101 |
| 3,342,505 A | * | 9/1967 | Diehl ................... | B60G 11/183 267/191 |
| 3,831,966 A | * | 8/1974 | Grosseau ............ | B60G 11/181 280/124.167 |
| 3,844,583 A | * | 10/1974 | Sakow ................. | B60G 11/20 280/124.13 |
| 4,094,532 A | * | 6/1978 | Johnson .............. | F16F 1/16 267/284 |
| 4,415,178 A | * | 11/1983 | Hatsushi ............. | B60G 21/05 280/124.152 |

(Continued)

FOREIGN PATENT DOCUMENTS

CN 103963728 B * 5/2016
DE 102012011920 A1 * 12/2013 ............ B60G 11/18

(Continued)

*Primary Examiner* — Laura Freedman

(57) ABSTRACT

A dual rate torsion bar suspension system is connected to a control arm and includes a first rate torsion bar and a second rate torsion bar connected to one another in order to provide the suspension system with a dual rate torque resistance. A cam mechanism is employed for isolating the second rate torsion bar from the first rate torsion bar.

9 Claims, 12 Drawing Sheets

(56) References Cited

U.S. PATENT DOCUMENTS

| | | | | |
|---|---|---|---|---|
| 4,521,033 | A * | 6/1985 | Lenhard-Backhaus | .................... B62D 55/108 280/124.13 |
| 4,540,197 | A * | 9/1985 | Finn | ....................... F16F 1/26 280/124.167 |
| 5,163,701 | A * | 11/1992 | Cromley, Jr. | ......... B60G 11/185 280/124.13 |
| 5,176,370 | A * | 1/1993 | Yamamoto | ............. B60G 11/18 267/273 |
| 5,326,128 | A * | 7/1994 | Cromley, Jr. | .......... B60G 3/145 301/128 |
| 5,556,083 | A * | 9/1996 | Furihata | ................... F16F 1/14 280/124.101 |
| 6,425,594 | B1 * | 7/2002 | Fader | .................. B60G 11/181 267/277 |
| 6,494,280 | B1 * | 12/2002 | Friend | ................... E05F 1/1033 49/386 |
| 6,651,991 | B2 * | 11/2003 | Carlstedt | ............ B60G 21/0556 280/5.511 |
| 6,945,522 | B2 * | 9/2005 | Eshelman | ............ B60G 17/025 267/273 |
| 8,052,161 | B2 * | 11/2011 | Preukschat | .......... B60G 17/025 280/124.167 |
| 8,191,911 | B1 * | 6/2012 | Reynolds | ................. B60G 3/20 280/124.13 |
| 8,511,697 | B2 * | 8/2013 | Ohletz | ............... B60G 17/0162 280/124.13 |
| 9,016,703 | B2 * | 4/2015 | Rowe | ..................... B60G 7/008 267/273 |
| 9,108,482 | B2 * | 8/2015 | Mohrlock | ............ B60G 11/183 |
| 2005/0051396 | A1 * | 3/2005 | Kawakami | ............... F16F 9/535 188/290 |

FOREIGN PATENT DOCUMENTS

| | | | |
|---|---|---|---|
| JP | 57099406 | A * | 6/1982 |
| JP | 59013146 | A * | 1/1984 |
| JP | 59013147 | A * | 1/1984 |
| JP | 01278815 | A * | 11/1989 |
| JP | 02208116 | A * | 8/1990 |

* cited by examiner

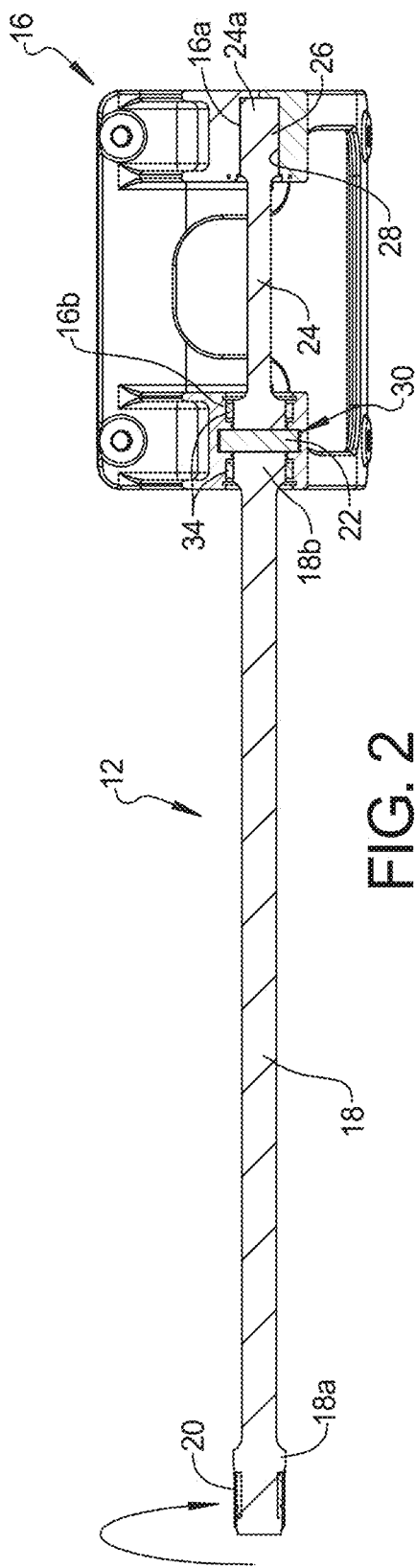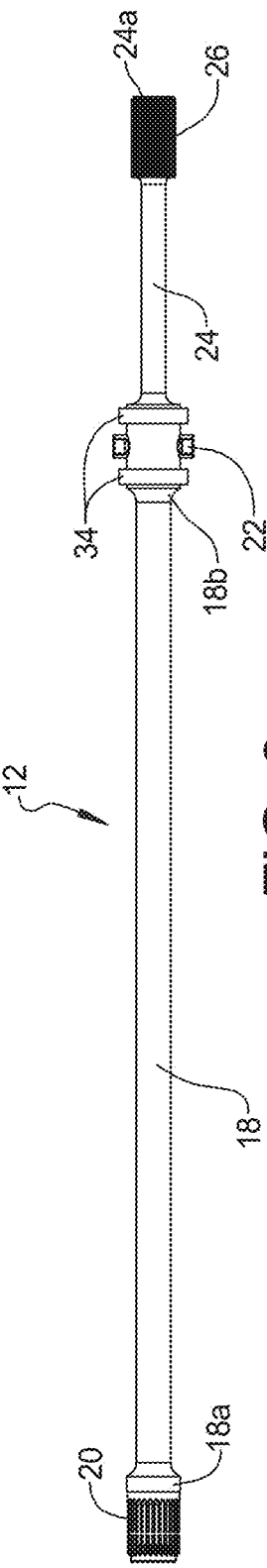

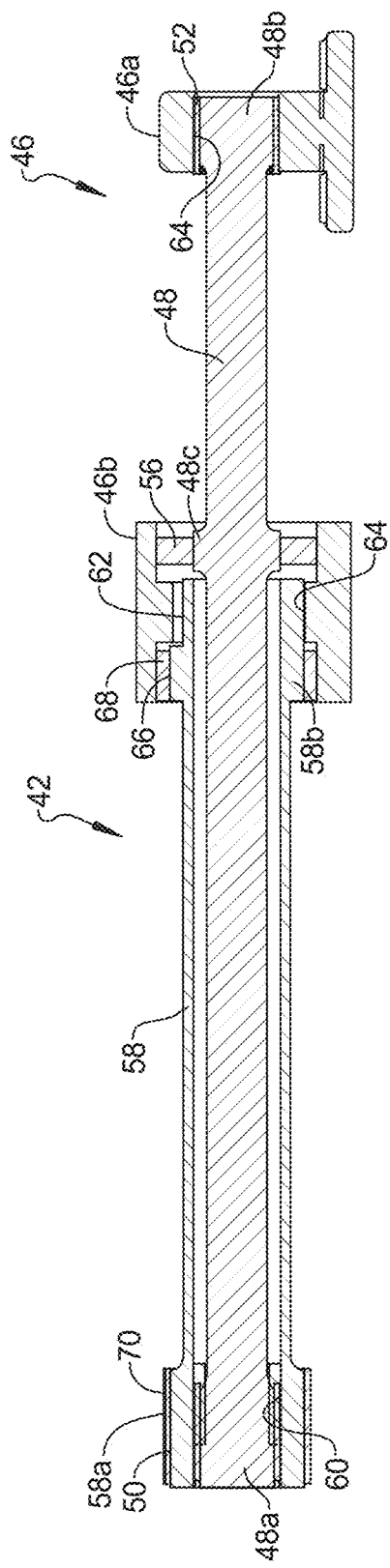
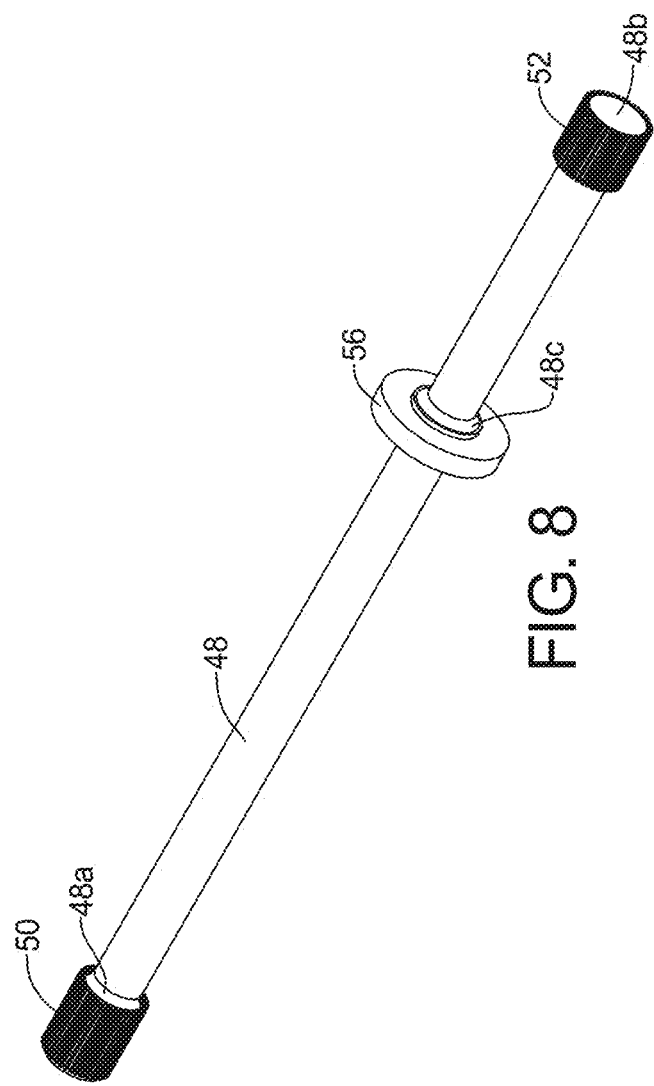
FIG. 7
FIG. 8

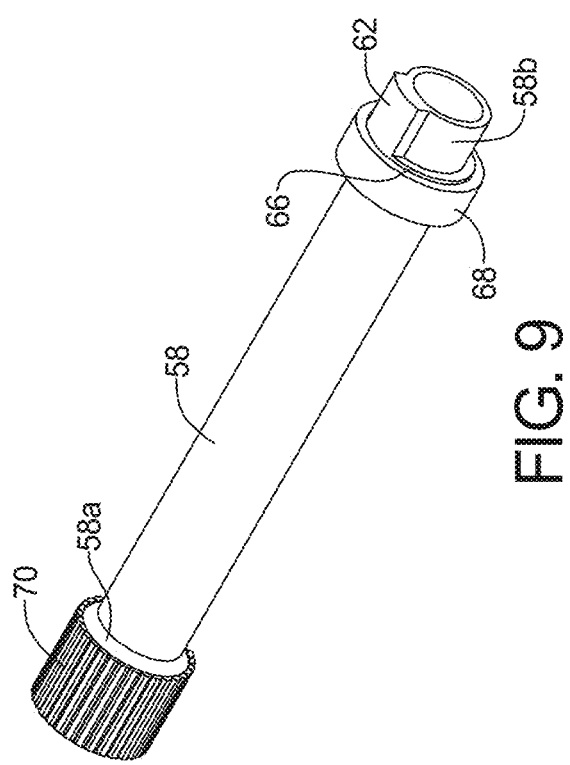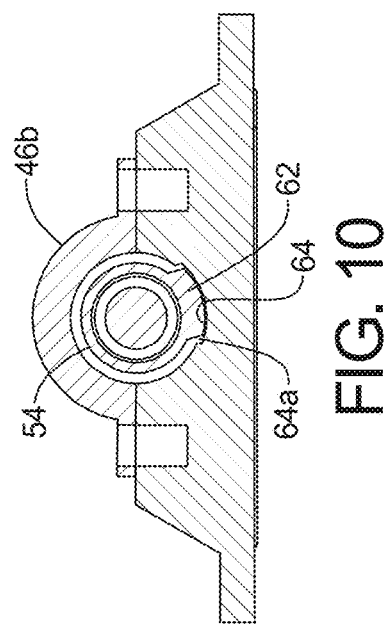

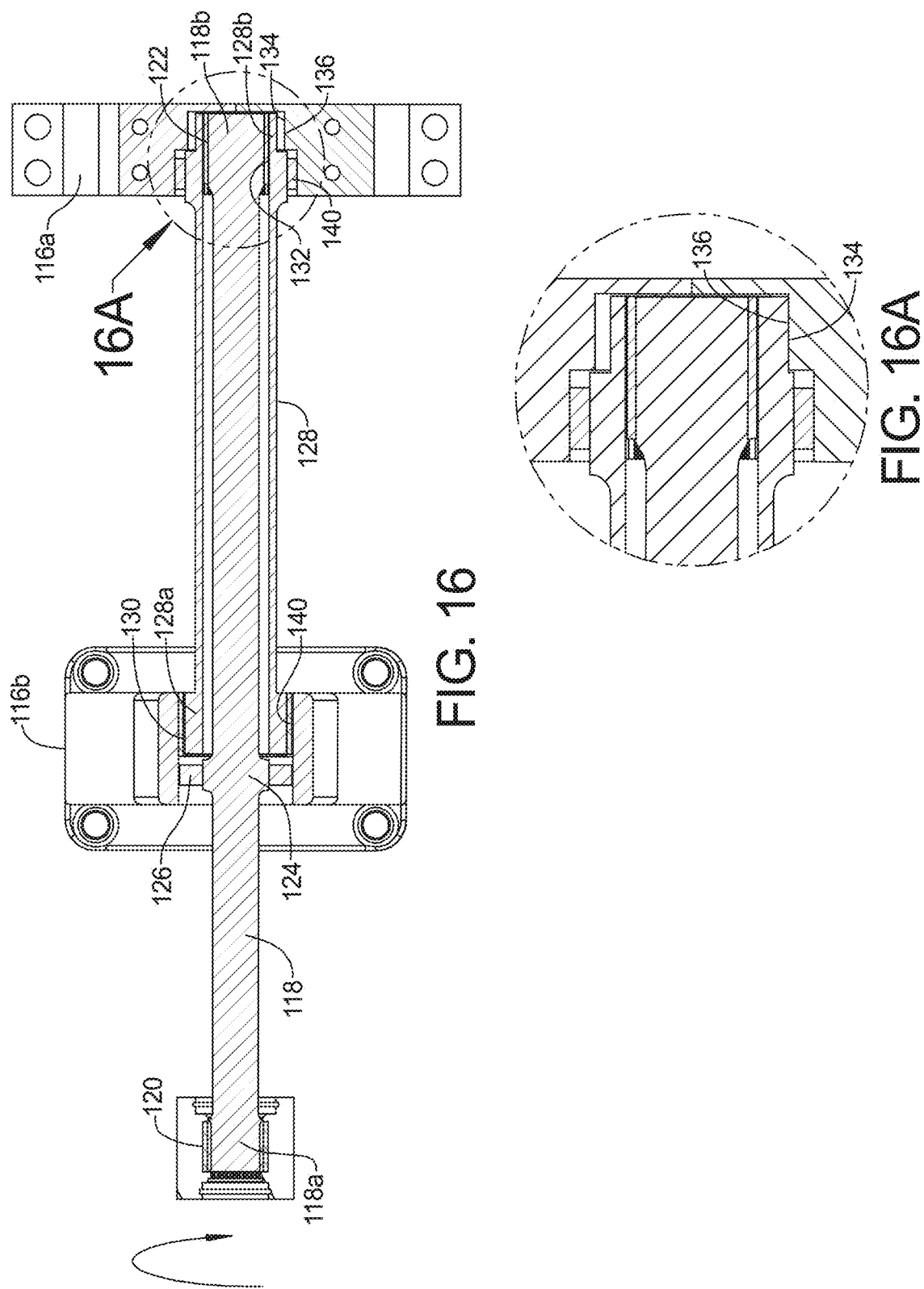

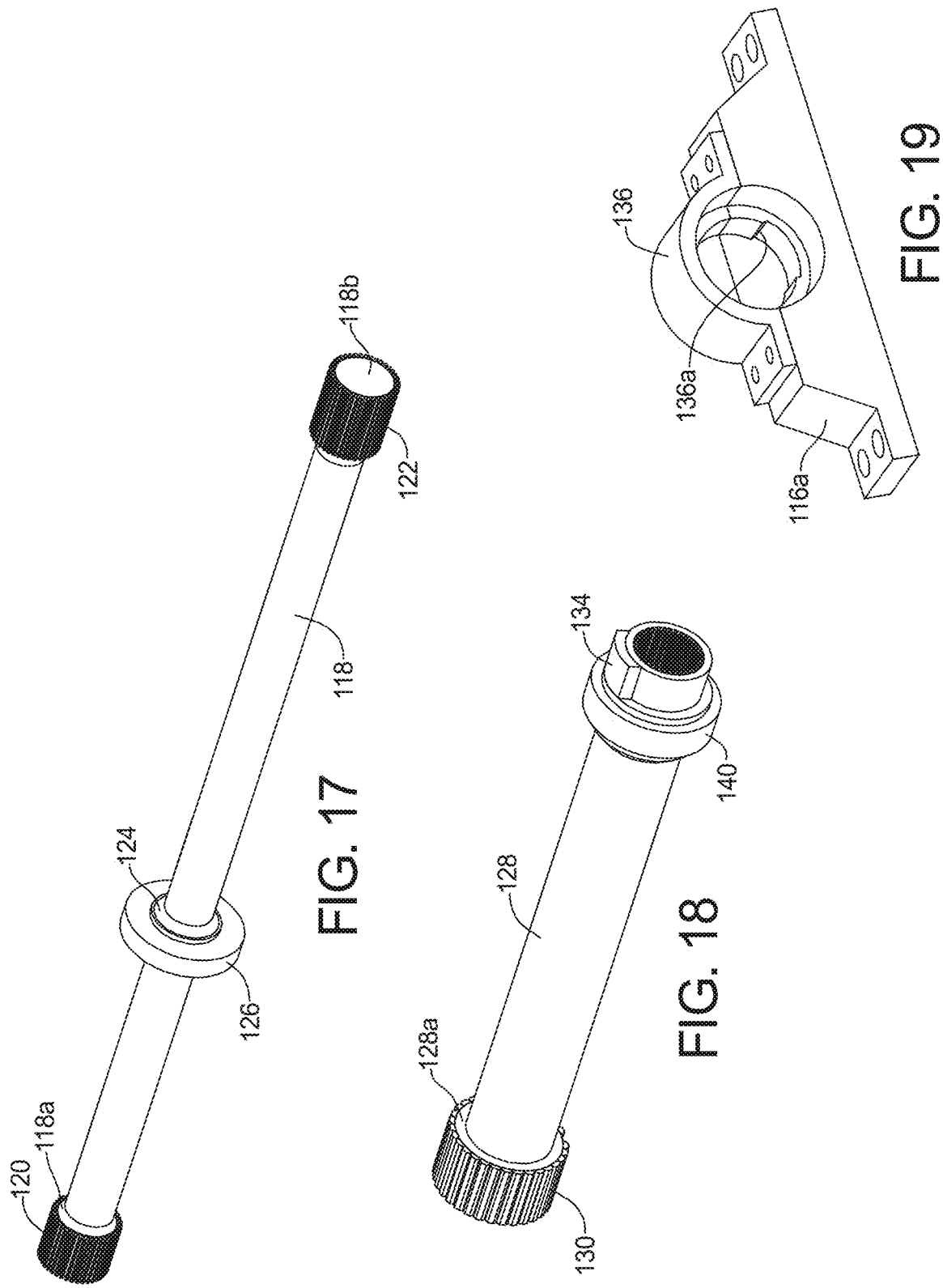

SUSPENSION SYSTEM WITH DUAL RATE TORSION BAR

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle suspension systems with a dual rate torsion bar.

A torsion bar suspension system is used to maintain the suspension system at predetermined height, support added weight and provide ride comfort, with the outboard end of the torsion bar attached to the control arm and the other end connect to a fixed position on the chassis. Torsion bars are made of an elastic material such as spring steel and resist torsion or twisting as the control arm rotates. Traditional torsion bar systems are only capable to generate one single spring rate. The spring rate is determined by the bar diameter or tube thickness (tubular bars), and the length of the bar or tube, limiting the vehicle tunability and loads mitigation. High spring rates help to minimize the vertical suspension loads, but it causes degradation on ride comfort and limits the rebound travel. The bar design is constrained by package space which constrains the length and diameter of the torsion BAR. Current torsion bar systems are limited to a single rate and requires a big space to package in the vehicle. Once the package is defined, the tunability is limited by the maximum length packageable and the durability constraints. Tuning is limited by the torsion bar diameter, solid vs hollow and by the torsion bar length. These tuning parameters do not enable variable suspension rates.

SUMMARY

According to an aspect of the present disclosure, a dual rate torsion bar includes a first torsion bar section having a proximal end with a first external spline and a distal end with an engagement cam. A second torsion bar section extends from the distal end of the first torsion bar section and has a distal end with a second external spline. A first bracket includes an interior spline engaging the second external spline of the second torsion bar section, the first bracket is configured to be mounted to a vehicle structure. A second bracket includes a cam bushing receiving the engagement cam, the second bracket is configured to be mounted to a vehicle structure. A control arm is mounted to the first external spline of the first torsion bar section.

According to a further aspect, the second torsion bar bracket includes a pair of bushings on opposite sides of the cam bushing.

According to a further aspect, the first torsion bar section has a different spring rate than the second torsion bar section.

According to a further aspect, the engagement cam is rotatable within the cam bushing and the cam bushing includes a stop surface for preventing rotatable movement of the engagement cam beyond a predetermined position.

According to a further aspect, the first torsion bar section is longer than the second torsion bar section.

According to a further aspect of the present disclosure a nested dual rate torsion bar includes a first rate torsion bar having a proximal end with a first outer spline and a distal end with a second outer spline. A second rate torsion bar includes a proximal end with an inner spline connected to the first outer spline of the first rate torsion bar and includes a third outer spline configured to engage with a control arm, the second rate torsion bar including a distal end with an engagement cam. A first torsion bar bracket includes a splined aperture for receiving the second outer spline of the first rate torsion bar, the first torsion bar bracket is configured to be mounted to a vehicle structure. A second torsion bar bracket is configured to be mounted to the vehicle structure and includes a cam bushing receiving the engagement cam of the second rate torsion bar. A control arm is mounted to the third outer spline of the second rate torsion bar According to a further aspect, the second torsion bar bracket includes a pair of bushings on opposite sides of the cam bushing.

According to a further aspect, the first rate torsion bar has a different spring rate than the second rate torsion bar.

According to a further aspect, the engagement cam is rotatable within the cam bushing and the cam bushing includes a stop surface for preventing rotatable movement of the engagement cam beyond a predetermined position.

According to a further aspect, the first rate torsion bar is longer than the second rate torsion bar.

According to another aspect of the present disclosure, a nested torsion bar includes a first rate torsion bar having a proximal end with a first outer spline and a distal end with a second outer spline. A second rate torsion bar includes a distal end with an inner spline connected to the second outer spline of the first rate torsion bar and includes a proximal end with a third outer spline. A first torsion bar bracket includes a splined aperture for receiving the third outer spline of the second rate torsion bar, the first torsion bar bracket is configured to be mounted to a vehicle structure. A second torsion bar bracket is configured to be mounted to the vehicle structure and includes a bearing rotatably receiving the distal end of the second rate torsion bar. A control arm is mounted to the first outer spline of the first rate torsion bar.

According to a further aspect, the first rate torsion bar has a different spring rate than the second rate torsion bar.

According to a further aspect, the first rate torsion bar includes a rubber bushing mounted thereto and disposed within the first torsion bar bracket.

According to a further aspect, the rubber bushing is adjacent to the proximal end of the second rate torsion bar.

According to a further aspect, the second rate torsion bar is hollow and receives the first rate torsion bar therein.

A dual rate torsion bar includes a first rate torsion bar having a proximal end with a first outer spline and a distal end with a second outer spline. A second rate torsion bar includes a distal end with an inner spline connected to the second outer spline of the first rate torsion bar and includes a third outer spline, the distal end of the second rate torsion bar includes an engagement cam. A first torsion bar bracket includes a splined aperture for receiving the third outer spline of the second rate torsion bar, the first torsion bar bracket is configured to be mounted to a vehicle structure. A second torsion bar bracket is configured to be mounted to the vehicle structure and includes a cam bushing receiving the engagement cam of the second rate torsion bar. A control arm is mounted to the first outer spline of the first rate torsion bar.

According to a further aspect, the first rate torsion bar has a different spring rate than the second rate torsion bar.

According to a further aspect, the engagement cam is rotatable within the cam bushing and the cam bushing includes a stop surface for preventing rotatable movement of the engagement cam beyond a predetermined position.

According to a further aspect, the distal end of the second rate torsion bar includes a rubber bushing mounted thereto and disposed within the second torsion bar bracket.

According to a further aspect, the first rate torsion bar includes a rubber bushing mounted thereto and disposed within the first torsion bar bracket.

The nested torsion bar design can double the effective length of the torsion bar making the practical tuning range much larger or allowing for a similar tuning range in ½ the space. The nested torsion bar also enables the ability to create a system with two rates by implementing a cam to transition from the first rate to the second rate. The nested torsion bars can provide more tuning capability for a single rate solution or dual rate capability just by adding a cam feature in the outer torsion bar and the structure bracket solving the main issues/limitations of the current technology.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 2 is a plan view of the dual rate torsion bar system of FIG. 1 with portions of the brackets removed for illustration purposes;

FIG. 3 is a plan view of the dual rate torsion bar of FIG. 1;

FIG. 7 is a plan view of the dual rate torsion bar system of FIG. 6 with portions of the brackets cut away for illustration purposes;

FIG. 8 is a perspective view of a first rate torsion bar of the dual rate torsion bar of FIG. 6;

FIG. 9 is a perspective view of a second rate torsion bar of the dual rate torsion bar of FIG. 6;

FIG. 10 is a cross-sectional view of the dual rate torsion bar cam mechanism;

FIGS. 16 and 16A area plan views of the dual rate torsion bar system of FIG. 15 with portions of the brackets cut away for illustration purposes;

FIG. 17 is a perspective view of a first rate torsion bar of the dual rate torsion bar of FIG. 15;

FIG. 18 is a perspective view of a second rate torsion bar of the dual rate torsion bar of FIG. 15; and FIG. 19 is a perspective view of the dual rate torsion bar cam bushing.

In the drawings, reference numbers may be reused to identify similar and/or identical elements.

DETAILED DESCRIPTION

Figure 1:
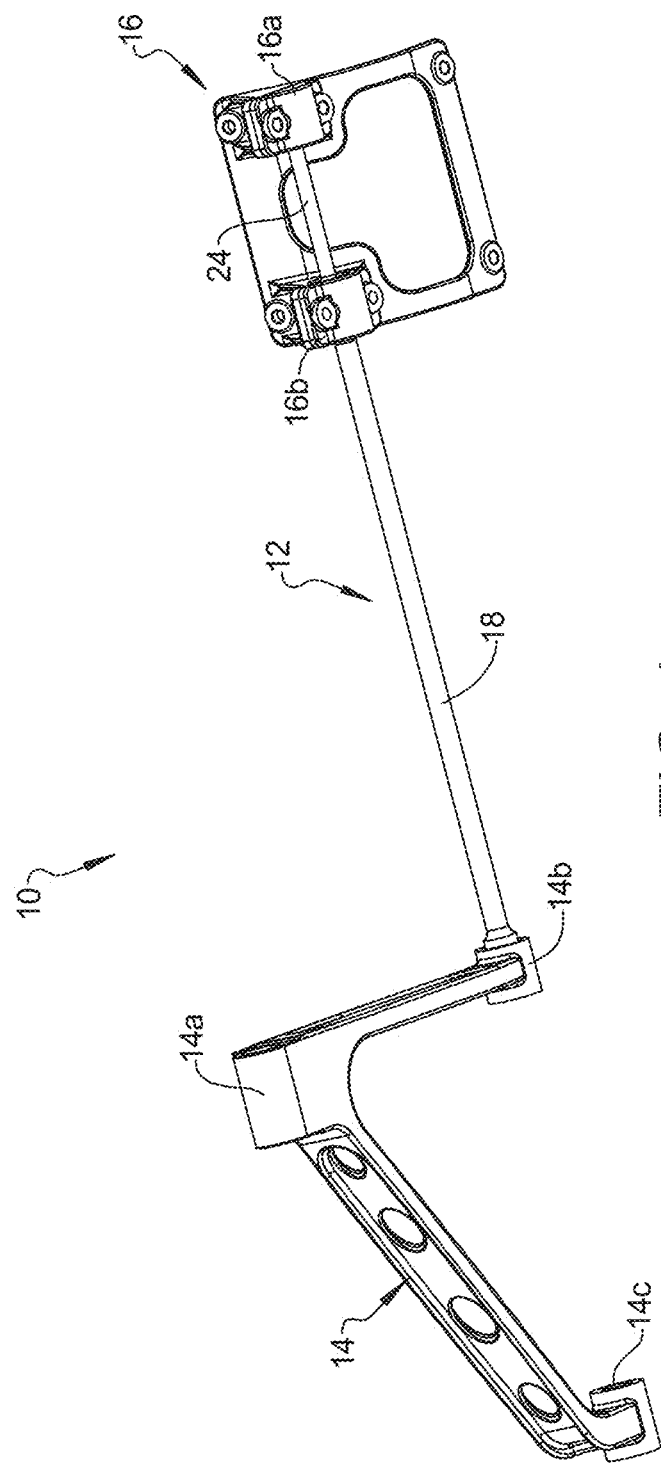
FIG. 1 is a perspective view of a vehicle control arm system with a dual rate torsion bar suspension system according to the principles of the present disclosure.

With reference to FIGS. 1-5, a vehicle control arm suspension system 10 with a dual rate torsion bar 12 will now be described. The control arm suspension system 10 includes a control arm 14 that includes a center mounting location 14a that is configured to be connected to a front wheel of a vehicle and includes a pair of arms 14b, 14c that are pivotally connected to the vehicle frame, as is known in the art. The dual rate torsion bar 12 is connected to one of the pair of arms 14b and is further connected to the vehicle frame or chassis by a bracket system 16.

With reference to FIG. 2, the dual rate torsion bar 12 includes a first rate torsion bar section 18 having a proximal end 18a with an external spline 20 and a distal end 18b with an engagement cam 22.

Figure 5:
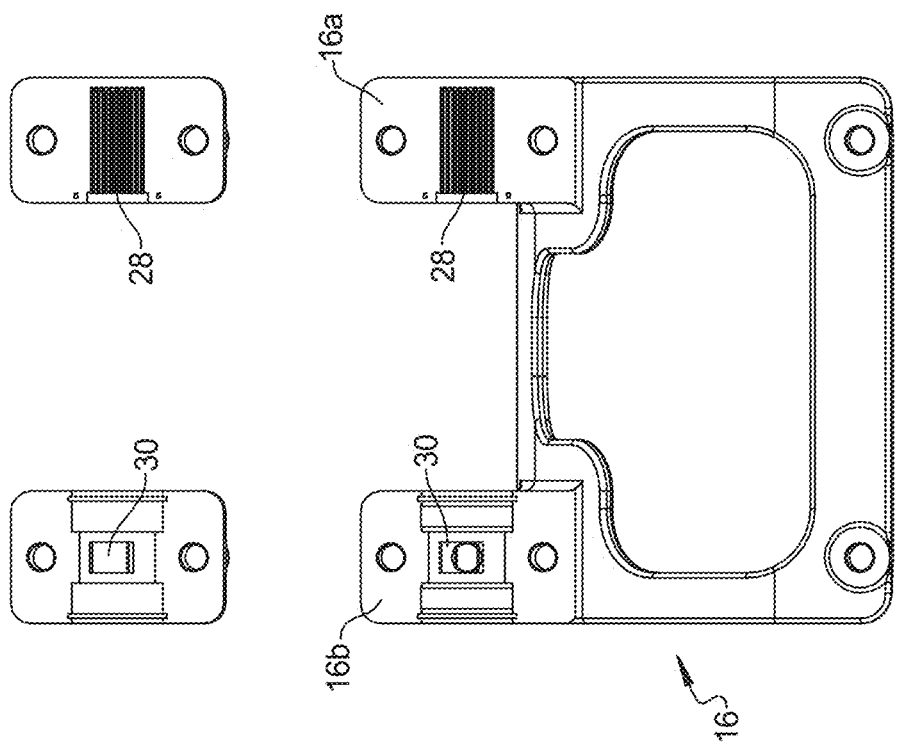
FIG. 5 is an exploded view of the bracket of a vehicle control arm/dual rate torsion bar suspension system.
Figure 4:
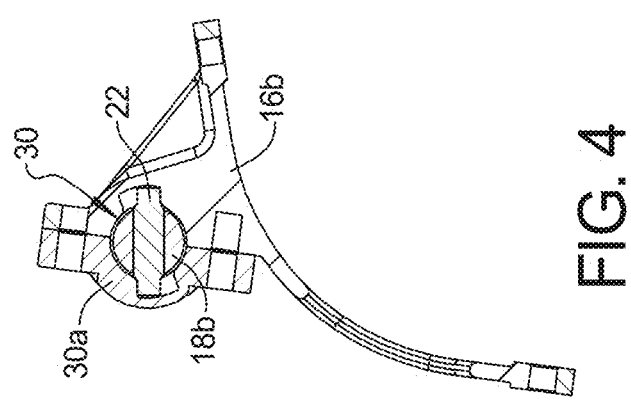
FIG. 4 is a cross-sectional view of the dual rate torsion bar cam mechanism.
Figure 6:
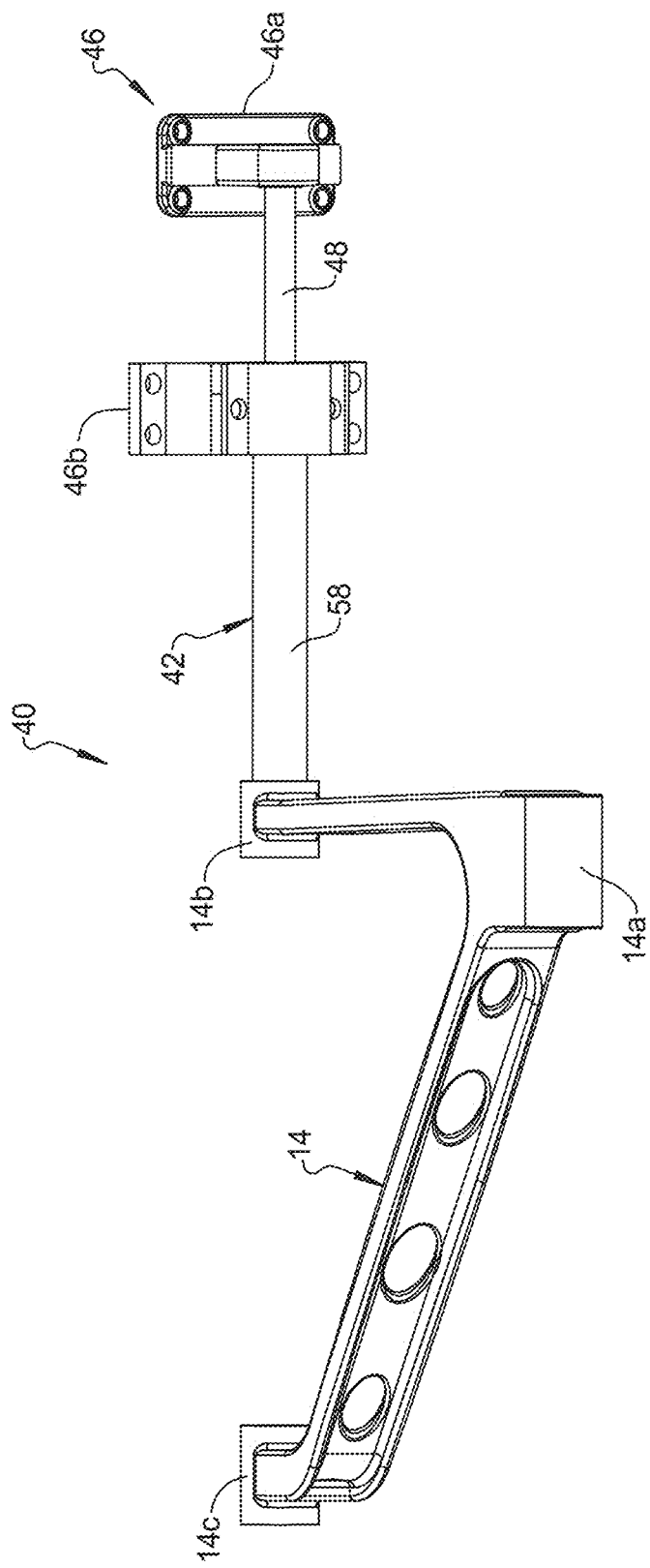
FIG. 6 is a perspective view of a second embodiment of a vehicle control arm/dual rate torsion bar suspension system according to the principles of the present disclosure.
Figure 11:
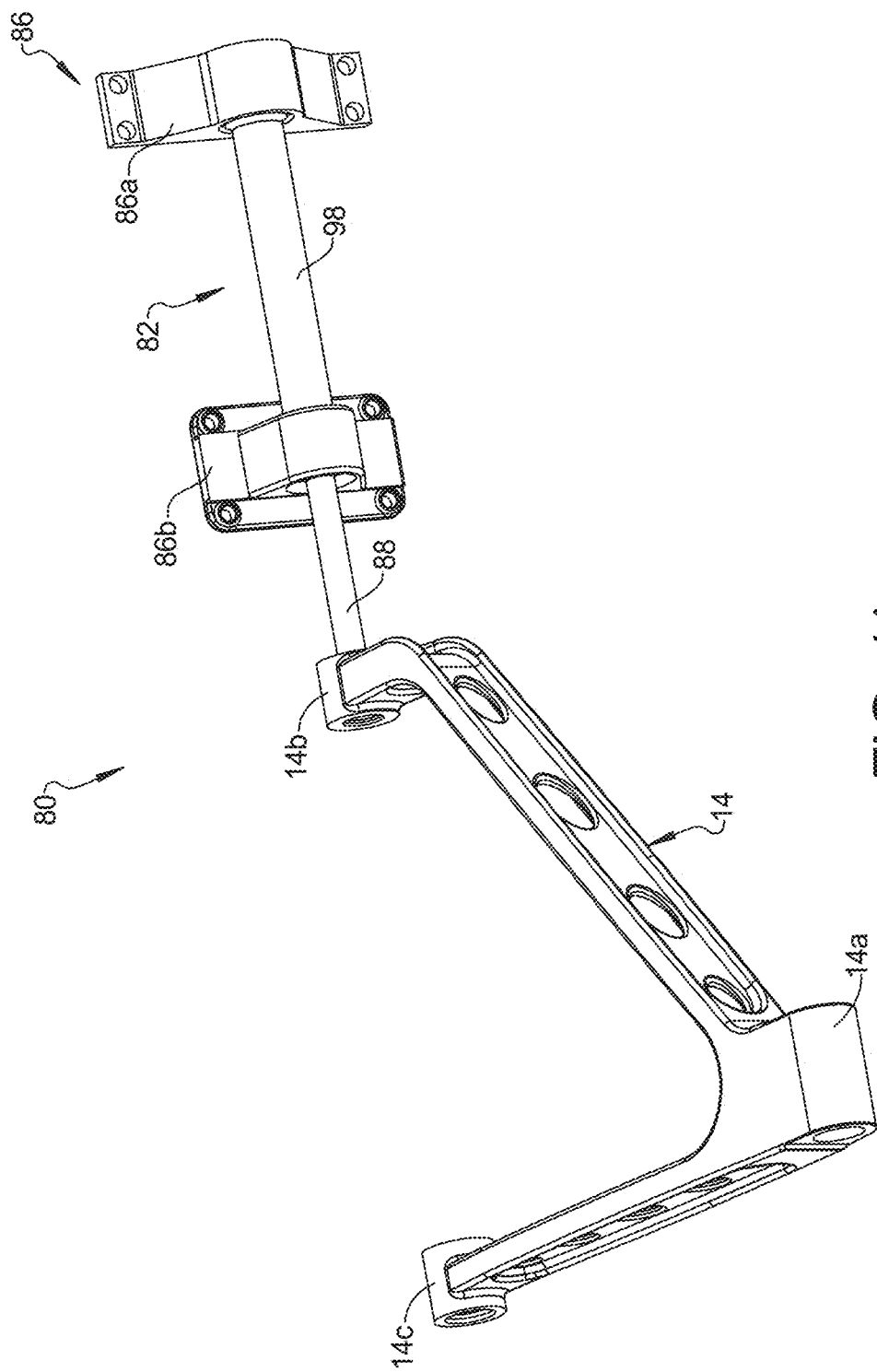
FIG. 11 is a perspective view of a third embodiment of a vehicle control arm/dual rate torsion bar suspension system according to the principles of the present disclosure.

A second rate torsion bar section 24 extends from the distal end 18b of the first rate torsion bar section 18. The second rate torsion bar section 24 includes a distal end 24a with an external spline 26. With reference to FIGS. 2 and 5, the bracket system 16 includes a first bracket 16a having an interior spline 28 engaging the second external spline 26 of the second rate torsion bar section 24.

The bracket system 16 includes a second bracket 16b having a cam bushing 30 receiving the engagement cam 22. The engagement cam 22 is received in the cam bushing 30 with the cam busing including a stop surface 30a (best shown in FIG. 4) for preventing rotatable movement of the engagement cam 22 beyond a predetermined position. The first bracket 16a and the second bracket 16b are configured to be mounted to the vehicle structure including the chassis or frame, either together as a unit or separately.

The first rate torsion bar section 18 and the second rate torsion bar section 24 can both be made from an elastic material such as spring steel, titanium, a composite or other material and the second rate torsion bar section 24 can have a smaller cross section than the first rate torsion bar section 18. In addition, the second rate torsion bar section 24 can be shorter than the first rate torsion bar section 18 so that the second rate torsion bar section 24 has a lower spring rate (k24) than a spring rate (k18) of the first rate torsion bar section 18.

In operation, as the vehicle passes over smaller bumps in the road, the control arm 14 is caused to move with the wheel and the control arm 14 imparts torque to the second rate torsion bar section 24 and the first rate torsion bar section 18 so that the system spring rate=$1/(1/k_{bar24}+1/k_{bar18})$ and when the vehicle encounters larger bumps and the engagement cam 22 engages the stop surface 30a of the cam bushing 30 the distal end of the second rate torsion bar section 24 is prevented from further rotating and the first rate torsion bar section 18 with the spring rate (k18) becomes the primary torsion bar section so that the system spring rate =$k_{bar18}$.

The proposed dual rate torsion bar suspension system of the first embodiment includes a torsion bar 12 with a cam feature 22 at a predetermined distance between the input and the reaction attachment of the torsion bar 12. The system works by applying a torque on one side of the torsion bar 12 twisting the full length of the torsion bar 12. At a predetermined angle of rotation, the cam 22 engages the stop surface 30a of the cam bushing 30 making the effective length of the torsion bar 12 shorter making the effective suspension stiffness higher. The torsion bar diameter can vary along the length of the torsion bar as needed to achieve desired spring rates for ride feel and durability needs.

The torsion bar 12 can be hollow or solid and can have splines to attach to the control arm 14 (twist input). The cam bushing 30 is in a bracket 16b to provide a reaction force at the engagement cam 22. The engagement cam 22 can be sealed with a pair of rubber bushings 34 to accommodate relative movement between the torsion bar 12 and the cam bushing bracket 16b providing additional support and sealing the system to prevent dirt accumulation in the cam bushing bracket 16b. The seal on the cam bushing bracket 16b can take on various other forms.

With reference to FIGS. 6-10, a vehicle control arm suspension system 40 with a dual rate torsion bar 42 will now be described. The control arm suspension system 40 includes a control arm 14 that includes a center mounting location 14a that is configured to be connected to a front wheel of a vehicle and includes a pair of arms 14b, 14c that are pivotally connected to the vehicle frame, as is known in the art. The dual rate torsion bar 42 is connected to one of the pair of arms 14b and is further connected to the vehicle frame or chassis by a bracket system 46. With reference to FIGS. 7 and 8, the dual rate torsion bar 42 includes a first rate torsion bar 48 having a proximal end 48a with an external spline 50 and a distal end 48b with an external spline 52. The first rate torsion bar 48 can further include an intermediate portion 48c having a rubber bushing 56.

With continued reference to FIG. 7, a second rate torsion bar 58 is hollow and receives the first rate torsion bar 48 therein. The second rate torsion bar 58 has a proximal end 58a with an interior spline 60 rotatably coupled to the exterior spline 50 of the first rate torsion bar 48 and includes a distal end 58b with an engagement cam 62.

The bracket system 46 includes a first bracket 46a having an interior spline 64 engaging the second external spline 52 of the first rate torsion bar 48. The bracket system 46 includes a second bracket 46b having a cam bushing 64 receiving the engagement cam 62. With reference to FIG. 10, the engagement cam 62 is received in the cam bushing 64 with the cam busing 64 including a stop surface 64a for preventing rotatable movement of the engagement cam 62 beyond a predetermined position. The first bracket 46a and the second bracket 46b are configured to be mounted to the vehicle structure including the chassis or frame.

The first rate torsion bar 48 and the second rate torsion bar 58 can both be made from an elastic material such as spring steel, titanium, a composite or other material and the second rate torsion bar 58 can have a larger cross section than the first rate torsion bar 48 and the second rate torsion bar 58 can be shorter than the first rate torsion bar 48 so that the second rate torsion bar 58 has a higher spring rate (k2) than a spring rate (k1) of the first rate torsion bar 48.

In operation, as the vehicle passes over smaller bumps in the road, the control arm 14 is caused to move with the wheel and the control arm 14 imparts torque to the first rate torsion bar 48 to apply a first spring rate ($k_{bar1}$) with the second rate torsion bar 58 rotating freely until the engagement cam 62 engages the stop surface 64a of the cam bushing 64 and then both the first rate torsion bar section 48 and the second rate torsion bar 58 both provide torque resistance ($k_{bar1}+k_{bar2}$) to the control arm 14.

The proposed system 40 is capable to provide two different suspension rates with a small package solution. The system 40 consists of two nested torsion bars 48, 58, rubber bushings 56, 66 and cam bushing assembly 62, 64. The proximal end 48a of the inner torsion bar 48 is attached to the outer torsion bar 58 and the distal end is connected to the fixed bracket 46a. The outer torsion bar 58 is attached to the control arm 14 (twist input) at the proximal end 58a where the inner bar 48 is attached and the other end 58b is attached to the structure by a fixed bracket 46b and a cam bushing 64 to engage the outer torsion bar 58 in the desirable position in the suspension travel.

The first rate inner torsion bar 48 (can be hollow or solid) has splines in both ends and machined feature with a bigger diameter than the splines to bond a rubber bushing 56 to accommodate relative movement between the torsion bars 48, 58, providing additional support and to seal the system (prevent dirt getting inside of the cam bracket assembly 46b and inner torsion bar 48).

The second rate torsion bar 58 is hollow with machined inner and outer splines 60, 70, respectively to provide attachment to the first rate torsion bar 48 (inner spline 60) and control arm 14 (outer spline 70). There is a machined cam feature 62 in the other end of the second rate outer torsion bar 58 to allow the outer torsion bar 58 to rotate until limited by the cam bushing 64 assembly. Another machined feature 66 like the first rate torsion bar 48 is located behind the bar cam mechanism 62 to have a bonded bushing 68 to accommodate relative movement between bars providing additional support and to seal the system to prevent dust from getting inside of the cam bushing assembly 64.

The cam bushing assembly 64 needs to be two pieces (lower and upper bracket 46b) for assembly purposes (interface to second torsion bar cam 62, bushings 66, 68). The second rate torsion bar 58 engagement is defined by the gap between the torsion bar cam 62 to the stop surface 64a of the cam bushing 64.

Figure 12:
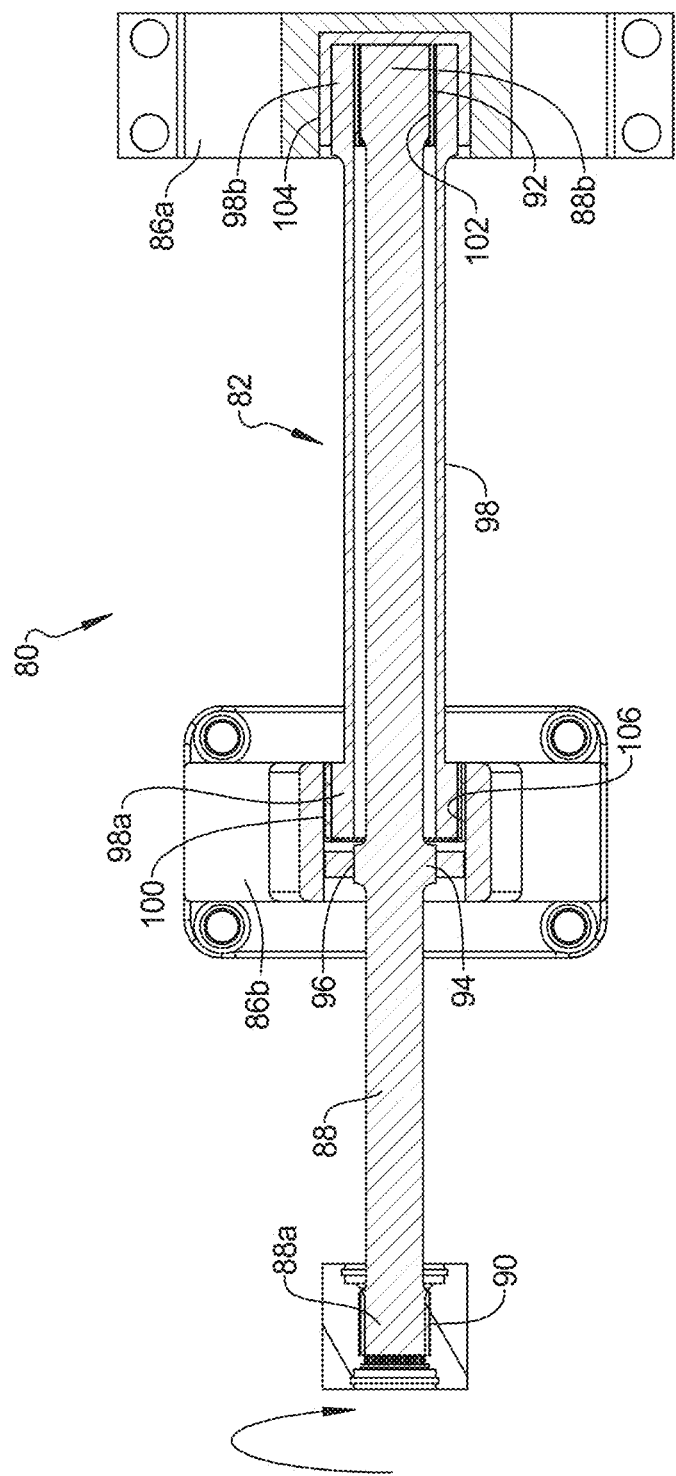
FIG. 12 is a plan view of the dual rate torsion bar system of FIG. 11 with portions of the brackets cut away for illustration purposes.
Figure 13:
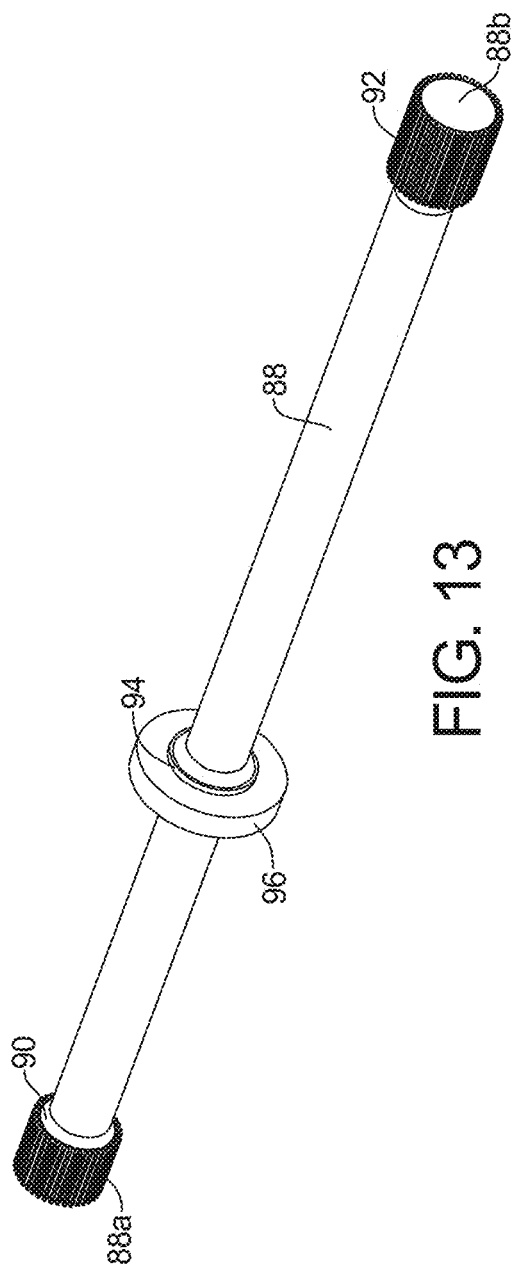
FIG. 13 is a perspective view of a first rate torsion bar of the dual rate torsion bar of FIG. 11.
Figure 14:
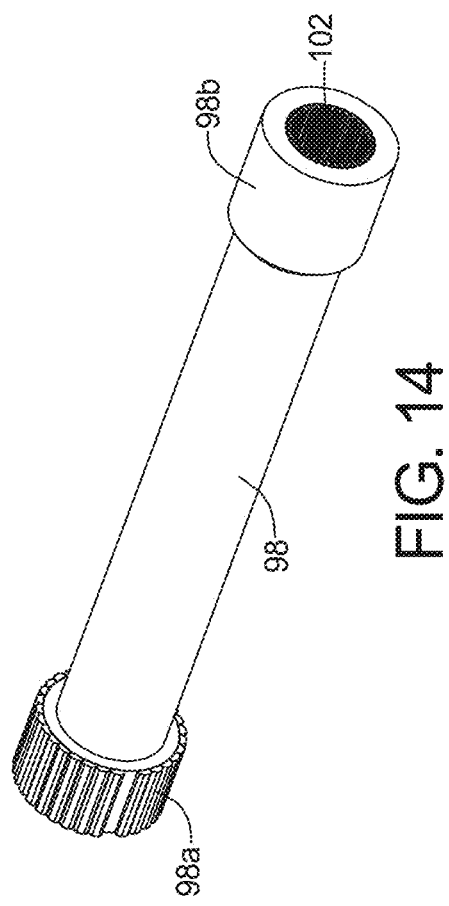
FIG. 14 is a perspective view of a second rate torsion bar of the dual rate torsion bar of FIG. 11.
Figure 15:
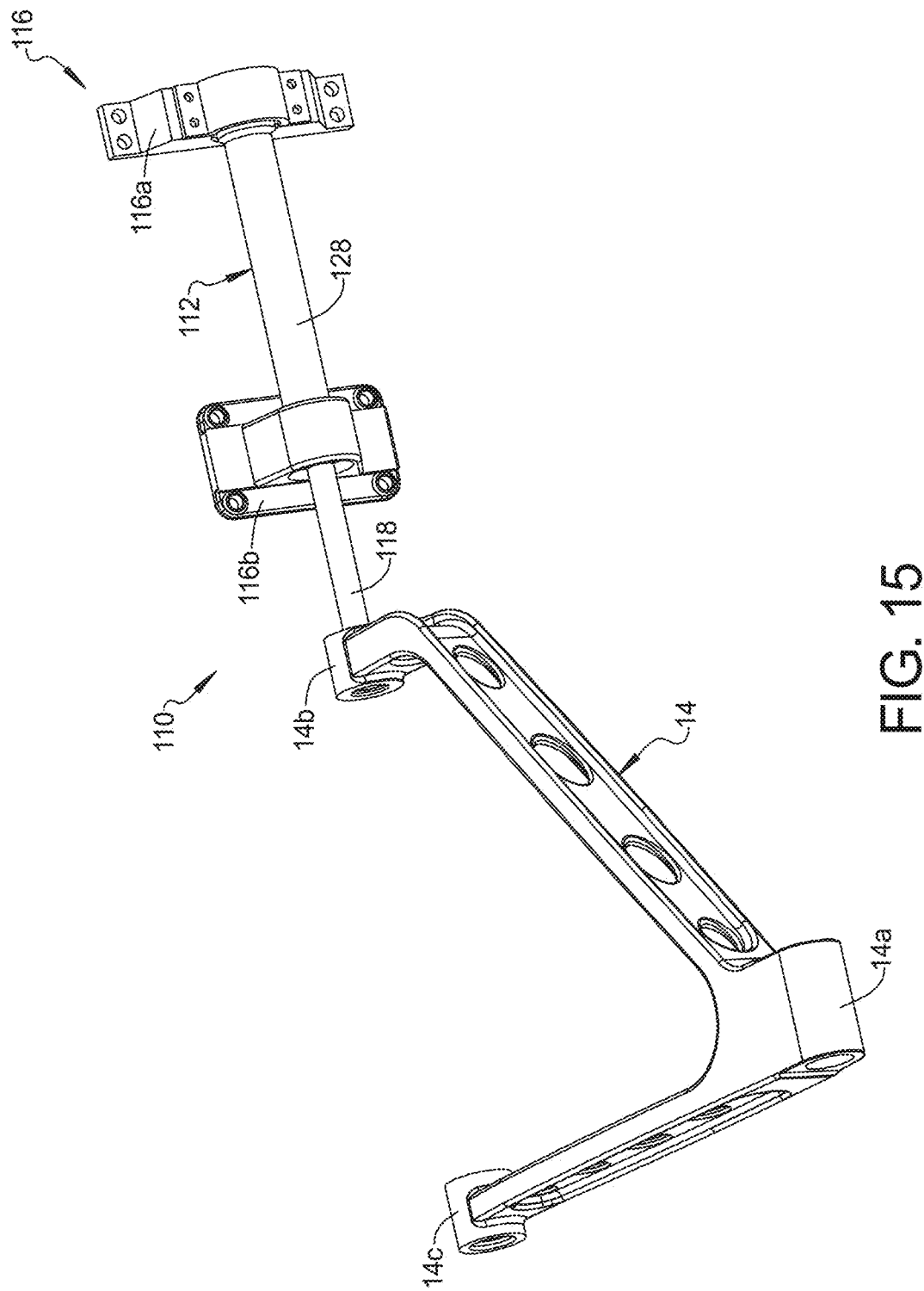
FIG. 15 is a perspective view of a fourth embodiment of a vehicle control arm/dual rate torsion bar suspension system according to the principles of the present disclosure.

With reference to FIGS. 11-14, a vehicle control arm suspension system 80 with a torsion bar 82 will now be described. The control arm suspension system 80 includes a control arm 14 that includes a center mounting location 14a that is configured to be connected to a wheel of a vehicle and includes a pair of arms 14b, 14c that are pivotally connected to the vehicle frame, as is known in the art. The dual rate torsion bar 82 is connected to one of the pair of arms 14b, 14c and is further connected to the vehicle frame or chassis by a bracket system 86. With reference to FIG. 12, the dual rate torsion bar 82 includes a first rate torsion bar 88 having a proximal end 88a with an external spline 90 and a distal end 88b with an external spline 92. The first rate torsion bar 88 can further include an intermediate portion 94 having a rubber bushing 96.

With continued reference to FIG. 12, a second rate torsion bar 98 is hollow and receives the first rate torsion bar 88 therein. The second rate torsion bar 98 has a proximal end 98a with an exterior spline 100 and a distal end 98b with an interior spline 102 connected to the external spline 92 at the distal end 88b of the first rate torsion bar 88.

The bracket system 86 includes a first bracket 86a having a bushing 104 that receives the distal end of 98b of the second rate torsion bar 98. The bracket system 86 includes a second bracket 86b having an interior spline 106 for receiving the exterior spline 100 of the proximal end 98a of the second rate torsion bar 98. The first bracket 86a and the second bracket 86b are configured to be mounted to the vehicle structure including the chassis or frame.

The first rate torsion bar 88 and the second rate torsion bar 98 can both be made from steel and the second rate torsion bar 98 can have a larger cross section than the first rate torsion bar 88 and the second rate torsion bar 98 can be shorter than the first rate torsion bar 88 so that the second rate torsion bar 98 has a higher spring rate (k2) than a spring rate (k1) of the first rate torsion bar 88.

In operation, as the vehicle passes over bumps in the road, the control arm 14 is caused to move with the wheel and the control arm 14 imparts torque to the first rate torsion bar 88 and the second rate torsion bar 98 in a series connection. This proposed system consists of two nested torsion bars 88, 98, rubber bushings 96, planar bearings 104, and brackets 86a, 86b. The system 80 works by applying a torque in one end of the inner torsion bar 88 twisting the inner and outer bars 88, 98 at the same time. The inner and outer torsion bars 88, 98 are connected to one another by a spline connection 92, 102, the outer torsion bar 98 has a planar bearing attached to the structure by a bracket 86a allowing both torsion bars 88, 98 to twist at the same time while the proximal end 98a of the outer bar 98 is attached to the structure via the second bracket 86b. This scenario enables the inner and outer bars 88, 98 to be used in series resulting in a lower system spring rate than each bar by itself.

Both ends of the inner torsion bar 88 (can be hollow or solid) have splines 90, 92 to attach to control arm 14 (twist input) and outer torsion bar 98. A rubber bushing 96 is bonded to the torsion bar 88 to accommodate relative movement between the torsion bars 88, 98 providing additional support and sealing the system to avoid dirt accumulation between the bars.

The outer hollow torsion bar 98 has inner splines 102 in the distal end (inner torsion bar attachment) and a machined outer diameter to accommodate a planar bearing 104 (the planar bearing can be replaced by a conventional rubber bushing or a cross axis ball joint) that is attached to the structure bracket 86a, the proximal end 98a has outer splines 100 to attach the second rate torsion bar 98 to the inner splines 106 of the second structure bracket 86b.

With reference to FIGS. 15-19, a vehicle control arm suspension system 110 with a dual rate torsion bar 112 will now be described. The control arm suspension system 110 includes a control arm 14 that includes a center mounting location 14a that is configured to be connected to a front wheel of a vehicle and includes a pair of arms 14b, 14c that are pivotally connected to the vehicle frame, as is known in the art. The dual rate torsion bar 112 is connected to one of the pair of arms 14b and is further connected to the vehicle frame or chassis by a bracket system 116. With reference to FIG. 16, the dual rate torsion bar 112 includes a first rate torsion bar 118 having a proximal end 118a with an external spline 120 and a distal end 118b with an external spline 122. The first rate torsion bar 118 can further include an intermediate portion 124 having a rubber bushing 126.

With continued reference to FIG. 16, a second rate torsion bar 128 is hollow and receives the first rate torsion bar 118 therein. The second rate torsion bar 128 has a proximal end 128a with an exterior spline 130 and a distal end 128b with an interior spline 132 connected to the external spline 122 at the distal end 118b of the first rate torsion bar 118. The distal end of 128b of the second rate torsion bar 128 includes an engagement cam 134.

The bracket system 116 includes a first bracket 116a having a cam bushing 136 that receives the engagement cam 134 of the second rate torsion bar 128. The bracket system 116 includes a second bracket 116b having an interior spline 140 for receiving the exterior spline 130 of the proximal end 128a of the second rate torsion bar 128. The first bracket 116a and the second bracket 116b are configured to be mounted to the vehicle structure including the chassis or frame.

The first rate torsion bar 118 and the second rate torsion bar 128 can both be made from an elastic material such as spring steel, titanium, a composite or other material and the second rate torsion bar 128 can have a larger cross section than the first rate torsion bar 118 and the second rate torsion bar 128 can be shorter than the first rate torsion bar 118 so that the second rate torsion bar 128 has a higher spring rate (k2) than a spring rate (k1) of the first rate torsion bar 118.

In operation, as the vehicle passes over bumps in the road, the control arm 14 is caused to move with the wheel and the control arm 14 imparts torque to the first rate torsion bar 118 and the second rate torsion bar 128 in a series connection. The proposed system is capable to provide two different suspension rates with a small package solution. The system consists of two nested torsion bars 118, 128, rubber bushings 126, 140, a CAM bracket assembly 134, 136 where one end 118a of the inner torsion bar 118 is attached to the control arm 14 (twist input) and the other end 118b is attached to the outer torsion bar 128 by splines 122, 132. The distal end 128b of the outer torsion bar 128 has a bonded rubber bushing 140 and the cam system 134, 136 capable to engage the second torsion rate bar 128 in the desirable suspension travel position and the proximal end 128a is attached to the vehicle structure by the bracket 116b. The first rate is the series rate of the inner and outer torsion bars 118, 128.

The outer torsion bar 128 is hollow with machined inner splines 132 and outer splines 130 to provide attachment to the first rate torsion bar 118 (inner spline 132) and structure bracket 116b (outer spline 130). There is a machined cam feature attached to the outer torsion bar 128 to allow the bar 128 to rotate along with the inner torsion bar 118 until limited by the cam bracket assembly 134, 136. This is the second stage rate (k1) of the inner bar only.

The bracket 116a supporting the cam bracket assembly 134, 136 needs to be two pieces (lower and upper bracket) for assembly purpose (interface to second torsion bar cam, bushings). The second rate torsion bar 128 engagement is defined by the gap between the torsion bar cam 134 to the stop surface 136a of the cam bushing 136.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A dual rate torsion bar, comprising:
   a first rate torsion bar section having a proximal end with a first external spline and a distal end with a cylindrical pin-shaped engagement cam extending through and protruding from an aperture in the distal end of the first rate torsion bar section;
   a second rate torsion bar section extending from the distal end of the first rate torsion bar section and having a distal end with a second external spline;
   a first bracket having an interior spline engaging the second external spline of the second rate torsion bar section, the first bracket configured to be mounted to a vehicle structure;
   a second bracket having a cam bushing receiving the engagement cam, the second bracket configured to be mounted to the vehicle structure, wherein the engagement cam is rotatable within the cam bushing and the cam bushing includes a stop surface for preventing rotatable movement of the engagement cam beyond a predetermined position; and
   a control arm mounted to the first external spline of the first rate torsion bar section.

2. The dual rate torsion bar according to claim 1, wherein the second torsion bar bracket includes a pair of bushings on opposite sides of the cam bushing.

3. The dual rate torsion bar according to claim 1, wherein the first rate torsion bar section has a different spring rate than the second rate torsion bar section.

4. The dual rate torsion bar according to claim 1, wherein the first rate torsion bar section is longer than the second rate torsion bar section.

5. A nested torsion bar, comprising:
   a first rate torsion bar having a proximal end with a first outer spline and a distal end with a second outer spline;
   a second rate torsion bar having a distal end with an inner spline connected to the second outer spline of the first rate torsion bar and including a proximal end with a third outer spline;
   a first torsion bar bracket having a splined aperture for receiving the third outer spline of the second rate torsion bar, the first torsion bar bracket configured to be mounted to a vehicle structure;
   a second torsion bar bracket configured to be mounted to the vehicle structure and receiving the distal end of the second rate torsion bar; and
   a control arm mounted to the first outer spline of the first rate torsion bar;
   wherein the distal end of the second rate torsion bar includes an engagement cam and the second torsion bar bracket includes a cam bushing receiving the engagement cam of the second rate torsion bar; and
   wherein the engagement cam is rotatable within the cam bushing and the cam bushing includes a stop surface for preventing rotatable movement of the engagement cam beyond a predetermined position.

6. The nested torsion bar according to claim 5, wherein the first rate torsion bar has a different spring rate than the second rate torsion bar.

7. The nested torsion bar according to claim 5, wherein the first rate torsion bar includes a rubber bushing mounted thereto and disposed within the first torsion bar bracket.

8. The nested torsion bar according to claim 7, wherein the rubber bushing is adjacent to the proximal end of the second rate torsion bar.

9. The nested torsion bar according to claim 5, wherein the second rate torsion bar is hollow and receives the first rate torsion bar therein.

* * * * *